US009413691B2

(12) United States Patent
Venkatesh

(10) Patent No.: US 9,413,691 B2
(45) Date of Patent: Aug. 9, 2016

(54) MAC ADDRESS SYNCHRONIZATION IN A FABRIC SWITCH

(71) Applicant: BROCADE COMMUNICATIONS SYSTEMS, INC., San Jose, CA (US)

(72) Inventor: Vardarajan Venkatesh, Santa Clara, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 326 days.

(21) Appl. No.: 14/154,106

(22) Filed: Jan. 13, 2014

(65) Prior Publication Data

US 2014/0198801 A1    Jul. 17, 2014

Related U.S. Application Data

(60) Provisional application No. 61/751,803, filed on Jan. 11, 2013.

(51) Int. Cl.
*H04L 12/947* (2013.01)
*H04L 7/00* (2006.01)
*H04L 12/933* (2013.01)
*H04L 7/033* (2006.01)

(52) U.S. Cl.
CPC .............. *H04L 49/10* (2013.01); *H04L 7/0037* (2013.01); *H04L 7/0041* (2013.01); *H04L 7/0337* (2013.01)

(58) Field of Classification Search
CPC ..... H04L 49/10; H04L 7/0037; H04L 7/0041; H04L 7/0337
See application file for complete search history.

(56) References Cited

U.S. PATENT DOCUMENTS

| 829,529 A | 8/1906 | Keathley |
| 5,390,173 A | 2/1995 | Spinney |
| 5,802,278 A | 9/1998 | Isfeld |
| 5,878,232 A | 3/1999 | Marimuthu |
| 5,959,968 A | 9/1999 | Chin |
| 5,973,278 A | 10/1999 | Wehrill, III |
| 5,983,278 A | 11/1999 | Chong |
| 6,041,042 A | 3/2000 | Bussiere |

(Continued)

FOREIGN PATENT DOCUMENTS

| CN | 102801599 A | 11/2012 |
| EP | 0579567 | 5/1993 |

(Continued)

OTHER PUBLICATIONS

Rosen, E. et al., "BGP/MPLS VPNs", Mar. 1999.

(Continued)

*Primary Examiner* — Awet Haile
(74) *Attorney, Agent, or Firm* — Shun Yao; Park, Vaughan, Fleming & Dowler LLP

(57) ABSTRACT

One embodiment of the present invention provides a system for facilitating synchronization of MAC addresses in a fabric switch. During operation, the system divides a number of media access control (MAC) addresses associated with devices coupled to an interface of the switch. The system then computes a checksum for a respective chunk of MAC addresses. In addition, the system broadcasts MAC address information of the chunk to facilitate MAC address synchronization in a fabric switch of which the switch is a member, and to manage the chunks and their corresponding checksum, thereby correcting an unsynchronized or race condition in the fabric switch.

21 Claims, 6 Drawing Sheets

(56) References Cited

U.S. PATENT DOCUMENTS

| | | |
|---|---|---|
| 6,085,238 A | 7/2000 | Yuasa |
| 6,104,696 A | 8/2000 | Kadambi |
| 6,185,214 B1 | 2/2001 | Schwartz |
| 6,185,241 B1 | 2/2001 | Sun |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Philips |
| 6,633,761 B1 | 10/2003 | Singhal |
| 6,771,610 B1 | 8/2004 | Seaman |
| 6,873,602 B1 | 3/2005 | Ambe |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2 | 11/2010 | Hara |
| 7,843,906 B1 | 11/2010 | Chidambaram |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 * | 5/2012 | Yalagandula ........... H04L 45/66 370/408 |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake, III |
| 8,369,335 B2 | 2/2013 | Jha |
| 8,369,347 B2 | 2/2013 | Xiong |
| 8,392,496 B2 | 3/2013 | Linden |
| 8,462,774 B2 | 6/2013 | Page |
| 8,467,375 B2 | 6/2013 | Blair |
| 8,520,595 B2 | 8/2013 | Yadav |
| 8,599,850 B2 | 12/2013 | Jha et al. |
| 8,599,864 B2 | 12/2013 | Chung |
| 8,615,008 B2 | 12/2013 | Natarajan |
| 8,706,905 B1 | 4/2014 | McGlaughlin |
| 8,724,456 B1 | 5/2014 | Hong |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,995,272 B2 | 3/2015 | Agarwal |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0039350 A1 | 4/2002 | Wang |
| 2002/0054593 A1 | 5/2002 | Morohashi |
| 2002/0091795 A1 | 7/2002 | Yip |
| 2003/0041085 A1 | 2/2003 | Sato |
| 2003/0123393 A1 | 7/2003 | Feuerstraeter |
| 2003/0147385 A1 | 8/2003 | Montalvo |
| 2003/0174706 A1 | 9/2003 | Shankar |
| 2003/0189905 A1 | 10/2003 | Lee |
| 2003/0208616 A1 * | 11/2003 | Laing .................. H04L 12/2697 709/236 |
| 2003/0216143 A1 | 11/2003 | Roese |
| 2004/0001433 A1 | 1/2004 | Gram |
| 2004/0003094 A1 | 1/2004 | See |
| 2004/0010600 A1 | 1/2004 | Baldwin |
| 2004/0049699 A1 | 3/2004 | Griffith |
| 2004/0057430 A1 | 3/2004 | Paavolainen |
| 2004/0081171 A1 | 4/2004 | Finn |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2005/0007951 A1 | 1/2005 | Lapuh |
| 2005/0044199 A1 | 2/2005 | Shiga |
| 2005/0074001 A1 | 4/2005 | Mattes et al. |
| 2005/0094568 A1 | 5/2005 | Judd |
| 2005/0094630 A1 | 5/2005 | Valdevit |
| 2005/0122979 A1 | 6/2005 | Gross |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1 | 2/2006 | Perera |
| 2006/0034292 A1 | 2/2006 | Wakayama |
| 2006/0036765 A1 * | 2/2006 | Weyman ................ H04L 49/15 |

(56) References Cited

U.S. PATENT DOCUMENTS

| | | | |
|---|---|---|---|
| 2006/0059163 A1 | 3/2006 | Frattura | |
| 2006/0062187 A1 | 3/2006 | Rune | |
| 2006/0072550 A1 | 4/2006 | Davis | |
| 2006/0083254 A1 | 4/2006 | Ge | |
| 2006/0098589 A1 | 5/2006 | Kreeger | |
| 2006/0140130 A1 | 6/2006 | Kalkunte | |
| 2006/0168109 A1 | 7/2006 | Warmenhoven | |
| 2006/0184937 A1 | 8/2006 | Abels | |
| 2006/0221960 A1 | 10/2006 | Borgione | |
| 2006/0227776 A1 | 10/2006 | Chandrasekaran | |
| 2006/0235995 A1 | 10/2006 | Bhatia | |
| 2006/0242311 A1 | 10/2006 | Mai | |
| 2006/0245439 A1 | 11/2006 | Sajassi | |
| 2006/0251067 A1 | 11/2006 | DeSanti | |
| 2006/0256767 A1 | 11/2006 | Suzuki | |
| 2006/0265515 A1 | 11/2006 | Shiga | |
| 2006/0285499 A1 | 12/2006 | Tzeng | |
| 2006/0291388 A1 | 12/2006 | Amdahl | |
| 2006/0291480 A1 | 12/2006 | Cho | |
| 2007/0036178 A1 | 2/2007 | Hares | |
| 2007/0053294 A1 | 3/2007 | Ho | |
| 2007/0083625 A1 | 4/2007 | Chamdani | |
| 2007/0086362 A1 | 4/2007 | Kato | |
| 2007/0094464 A1 | 4/2007 | Sharma | |
| 2007/0097968 A1 | 5/2007 | Du | |
| 2007/0098006 A1 | 5/2007 | Parry | |
| 2007/0116224 A1 | 5/2007 | Burke | |
| 2007/0116422 A1 | 5/2007 | Reynolds | |
| 2007/0156659 A1 | 7/2007 | Lim | |
| 2007/0177525 A1 | 8/2007 | Wijnands | |
| 2007/0177597 A1 | 8/2007 | Ju | |
| 2007/0183313 A1 | 8/2007 | Narayanan | |
| 2007/0211712 A1 | 9/2007 | Fitch | |
| 2007/0258449 A1 | 11/2007 | Bennett | |
| 2007/0274234 A1 | 11/2007 | Kubota | |
| 2007/0289017 A1 | 12/2007 | Copeland et al. | |
| 2008/0052487 A1 | 2/2008 | Akahane | |
| 2008/0056135 A1 | 3/2008 | Lee | |
| 2008/0065760 A1 | 3/2008 | Damm | |
| 2008/0080517 A1 | 4/2008 | Roy | |
| 2008/0095160 A1 | 4/2008 | Yadav | |
| 2008/0101386 A1 | 5/2008 | Gray | |
| 2008/0112400 A1 | 5/2008 | Dunbar et al. | |
| 2008/0133760 A1 | 6/2008 | Berkvens et al. | |
| 2008/0159277 A1 | 7/2008 | Vobbilisetty | |
| 2008/0172492 A1 | 7/2008 | Raghunath | |
| 2008/0181196 A1 | 7/2008 | Regan | |
| 2008/0181243 A1 | 7/2008 | Vobbilisetty | |
| 2008/0186981 A1 | 8/2008 | Seto | |
| 2008/0205377 A1 | 8/2008 | Chao | |
| 2008/0219172 A1 | 9/2008 | Mohan | |
| 2008/0225852 A1 | 9/2008 | Raszuk | |
| 2008/0225853 A1 | 9/2008 | Melman | |
| 2008/0228897 A1 | 9/2008 | Ko | |
| 2008/0240129 A1 | 10/2008 | Elmeleegy | |
| 2008/0267179 A1 | 10/2008 | LaVigne | |
| 2008/0285458 A1 | 11/2008 | Lysne | |
| 2008/0285555 A1 | 11/2008 | Ogasahara | |
| 2008/0298248 A1 | 12/2008 | Roeck | |
| 2008/0304498 A1 | 12/2008 | Jorgensen | |
| 2008/0310342 A1 | 12/2008 | Kruys | |
| 2009/0022069 A1 | 1/2009 | Khan | |
| 2009/0037607 A1 | 2/2009 | Farinacci | |
| 2009/0042270 A1 | 2/2009 | Dolly | |
| 2009/0044270 A1 | 2/2009 | Shelly | |
| 2009/0067422 A1 | 3/2009 | Poppe | |
| 2009/0067442 A1 | 3/2009 | Killian | |
| 2009/0079560 A1 | 3/2009 | Fries | |
| 2009/0080345 A1 | 3/2009 | Gray | |
| 2009/0083445 A1 | 3/2009 | Ganga | |
| 2009/0092042 A1 | 4/2009 | Yuhara | |
| 2009/0092043 A1 | 4/2009 | Lapuh | |
| 2009/0106405 A1 | 4/2009 | Mazarick | |
| 2009/0116381 A1 | 5/2009 | Kanda | |
| 2009/0129384 A1 | 5/2009 | Regan | |
| 2009/0138577 A1 | 5/2009 | Casado | |
| 2009/0138752 A1 | 5/2009 | Graham | |
| 2009/0161584 A1 | 6/2009 | Guan | |
| 2009/0161670 A1 | 6/2009 | Shepherd | |
| 2009/0168647 A1 | 7/2009 | Holness | |
| 2009/0199177 A1 | 8/2009 | Edwards | |
| 2009/0204965 A1 | 8/2009 | Tanaka | |
| 2009/0213783 A1 | 8/2009 | Moreton | |
| 2009/0222879 A1 | 9/2009 | Kostal | |
| 2009/0232031 A1 | 9/2009 | Vasseur | |
| 2009/0245137 A1 | 10/2009 | Hares | |
| 2009/0245242 A1 | 10/2009 | Carlson | |
| 2009/0246137 A1 | 10/2009 | Hadida | |
| 2009/0252049 A1 | 10/2009 | Ludwig | |
| 2009/0252061 A1 | 10/2009 | Small | |
| 2009/0260083 A1 | 10/2009 | Szeto | |
| 2009/0279558 A1 | 11/2009 | Davis | |
| 2009/0292858 A1 | 11/2009 | Lambeth | |
| 2009/0316721 A1 | 12/2009 | Kanda | |
| 2009/0323698 A1 | 12/2009 | LeFaucheur | |
| 2009/0323708 A1 | 12/2009 | Ihle | |
| 2009/0327392 A1 | 12/2009 | Tripathi | |
| 2009/0327462 A1 | 12/2009 | Adams | |
| 2009/0328392 | 12/2009 | Tripathi | |
| 2010/0027420 A1 | 2/2010 | Smith | |
| 2010/0046471 A1 | 2/2010 | Hattori | |
| 2010/0054260 A1 | 3/2010 | Pandey | |
| 2010/0061269 A1 | 3/2010 | Banerjee | |
| 2010/0074175 A1 | 3/2010 | Banks | |
| 2010/0097941 A1 | 4/2010 | Carlson | |
| 2010/0103813 A1 | 4/2010 | Allan | |
| 2010/0103939 A1 | 4/2010 | Carlson | |
| 2010/0131636 A1 | 5/2010 | Suri | |
| 2010/0158024 A1 | 6/2010 | Sajassi | |
| 2010/0165877 A1 | 7/2010 | Shukla | |
| 2010/0165995 A1 | 7/2010 | Mehta | |
| 2010/0168467 A1 | 7/2010 | Johnston | |
| 2010/0169467 A1 | 7/2010 | Shukla | |
| 2010/0169948 A1 | 7/2010 | Budko | |
| 2010/0182920 A1 | 7/2010 | Matsuoka | |
| 2010/0195489 A1 | 8/2010 | Zhou | |
| 2010/0215042 A1 | 8/2010 | Sato | |
| 2010/0215049 A1 | 8/2010 | Raza | |
| 2010/0220724 A1 | 9/2010 | Rabie | |
| 2010/0226368 A1 | 9/2010 | Mack-Crane | |
| 2010/0226381 A1 | 9/2010 | Mehta | |
| 2010/0246388 A1 | 9/2010 | Gupta | |
| 2010/0257263 A1 | 10/2010 | Casado | |
| 2010/0265849 A1 | 10/2010 | Harel | |
| 2010/0271960 A1 | 10/2010 | Krygowski | |
| 2010/0272107 A1 | 10/2010 | Papp | |
| 2010/0281106 A1 | 11/2010 | Ashwood-Smith | |
| 2010/0284414 A1 | 11/2010 | Agarwal | |
| 2010/0284418 A1 | 11/2010 | Gray | |
| 2010/0287262 A1 | 11/2010 | Elzur | |
| 2010/0287548 A1 | 11/2010 | Zhou | |
| 2010/0290473 A1 | 11/2010 | Enduri | |
| 2010/0299527 A1 | 11/2010 | Arunan | |
| 2010/0303071 A1 | 12/2010 | Kotalwar | |
| 2010/0303075 A1 | 12/2010 | Tripathi | |
| 2010/0303083 A1 | 12/2010 | Belanger | |
| 2010/0309820 A1 | 12/2010 | Rajagopalan | |
| 2010/0309912 A1 | 12/2010 | Mehta | |
| 2010/0329110 A1 | 12/2010 | Rose | |
| 2011/0019678 A1 | 1/2011 | Mehta | |
| 2011/0032945 A1 | 2/2011 | Mullooly | |
| 2011/0035489 A1 | 2/2011 | McDaniel | |
| 2011/0035498 A1 | 2/2011 | Shah | |
| 2011/0044339 A1 | 2/2011 | Kotalwar | |
| 2011/0044352 A1 | 2/2011 | Chaitou | |
| 2011/0064086 A1 | 3/2011 | Xiong | |
| 2011/0064089 A1 | 3/2011 | Hidaka | |
| 2011/0072208 A1 | 3/2011 | Gulati | |
| 2011/0085560 A1 | 4/2011 | Chawla | |
| 2011/0085563 A1 | 4/2011 | Kotha | |
| 2011/0110266 A1 | 5/2011 | Li | |
| 2011/0134802 A1 | 6/2011 | Rajagopalan | |
| 2011/0134803 A1 | 6/2011 | Dalvi | |

709/245

(56) References Cited

U.S. PATENT DOCUMENTS

| | | |
|---|---|---|
| 2011/0134925 A1 | 6/2011 | Safrai |
| 2011/0142053 A1 | 6/2011 | Van Der Merwe |
| 2011/0142062 A1 | 6/2011 | Wang |
| 2011/0161494 A1 | 6/2011 | Mcdysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0274114 A1 | 11/2011 | Dhar |
| 2011/0280572 A1 | 11/2011 | Vobbilisetty |
| 2011/0286457 A1 | 11/2011 | En |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob Da Silva |
| 2012/0033668 A1 | 2/2012 | Humphries |
| 2012/0033669 A1 | 2/2012 | Mohandas |
| 2012/0033672 A1 | 2/2012 | Page |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0177039 A1 | 7/2012 | Berman |
| 2012/0210416 A1 | 8/2012 | Mihelich |
| 2012/0243539 A1 | 9/2012 | Keesara |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0067466 A1 | 3/2013 | Combs |
| 2013/0070762 A1 | 3/2013 | Adams |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0136123 A1 | 5/2013 | Ge |
| 2013/0148546 A1 | 6/2013 | Eisenhauer |
| 2013/0194914 A1 | 8/2013 | Agarwal |
| 2013/0219473 A1 | 8/2013 | Schaefer |
| 2013/0250951 A1 | 9/2013 | Koganti |
| 2013/0259037 A1 | 10/2013 | Natarajan |
| 2013/0272135 A1 | 10/2013 | Leong |
| 2013/0294451 A1 | 11/2013 | Li |
| 2013/0301642 A1 | 11/2013 | Radhakrishnan |
| 2013/0346583 A1 | 12/2013 | Low |
| 2014/0013324 A1 | 1/2014 | Zhang |
| 2014/0025736 A1 | 1/2014 | Wang |
| 2014/0044126 A1 | 2/2014 | Sabhanatarajan |
| 2014/0056298 A1 | 2/2014 | Vobbilisetty |
| 2014/0105034 A1 | 4/2014 | Sun |
| 2015/0010007 A1 | 1/2015 | Matsuhira |
| 2015/0030031 A1 | 1/2015 | Zhou |
| 2015/0143369 A1 | 5/2015 | Zheng |

FOREIGN PATENT DOCUMENTS

| | | |
|---|---|---|
| EP | 0579567 A2 | 1/1994 |
| EP | 0993156 A2 | 12/2000 |
| EP | 1398920 A2 | 3/2004 |
| EP | 1916807 A2 | 4/2008 |
| EP | 2001167 A1 | 12/2008 |
| WO | 2008056838 | 5/2008 |
| WO | 2009042919 | 4/2009 |
| WO | 2010111142 A1 | 9/2010 |
| WO | 2014031781 | 2/2014 |

OTHER PUBLICATIONS

Office Action for U.S. Appl. No. 14/577,785, filed Dec. 19, 2014, dated Apr. 13, 2015.
Office Action for U.S. Appl. No. 13/786,328, filed Mar. 5, 2013, dated Mar. 13, 2015.
Office Action for U.S. Appl. No. 13/425,238, filed Mar. 20, 2012, dated Mar. 12, 2015.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Zhai F. Hu et al. 'RBridge: Pseudo-Nickname; draft-hu-trill-pseudonode-nickname-02.txt', May 15, 2012.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013.
Narten, T. et al. "Problem Statement: Overlays for Network Virtualization draft-narten-nvo3-overlay-problem-statement-01", Oct. 31, 2011.

(56) References Cited

OTHER PUBLICATIONS

Knight, Paul et al. "Layer 2 and 3 Virtual Private Networks: Taxonomy, Technology, and Standardization Efforts", 2004.
An Introduction to Brocade VCS Fabric Technology, Dec. 3, 2012.
Kreeger, L. et al. "Network Virtualization Overlay Control Protocol Requirements draft-kreeger-nvo3-overlay-cp-00", Aug. 2, 2012.
Knight, Paul et al., "Network based IP VPN Architecture using Virtual Routers", May 2003.
Louati, Wajdi et al., "Network-Based Virtual Personal Overlay Networks Using Programmable Virtual Routers", 2005.
Brocade Unveils "The Effortless Network", 2009.
The Effortless Network: HyperEdge Technology for the Campus LAN, 2012.
Foundary FastIron Configuration Guide, Software Release FSX 04.2.00b, Software Release FWS 04.3.00, Software Release FGS 05.0.00a, 2008.
FastIron and Turbulron 24x Configuration Guide, 2010.
FastIron Configuration Guide, Supporting IronWare Software Release 07.0.00, 2009.
Christensen, M. et al., Considerations for Internet Group Management Protocol (IGMP) and Multicast Listener Discovery (MLD) Snooping Switches, 2006.
Perlman, Radia et al. "RBridges: Base Protocol Specification", <draft-ietf-trill-rbridge-protocol-16.txt>, 2010.
Brocade Fabric OS (FOS) 6.2 Virtual Fabrics Feature Frequently Asked Questions, 2009.
Eastlake III, Donald et al., "RBridges: Trill Header Options", 2009.
Perlman, Radia "Challenges and Opportunities in the Design of TRILL: a Routed layer 2 Technology", 2009.
Perlman, Radia et al., "RBridge VLAN Mapping", <draft-ietf-trill-rbridge-vlan-mapping-01.txt>, 2009.
Knight, S. et al., "Virtual Router Redundancy Protocol", 1998.
"Switched Virtual Internetworking moves beyond bridges and routers", 8178 Data Communications 23(1994) Sep., No. 12.
Touch, J. et al., "Transparent Interconnection of Lots of Links (TRILL): Problem and Applicability Statement", 2009.
Lapuh, Roger et al., "Split Multi-link Trunking (SMLT)", 2002.
Lapuh, Roger et al., "Split Multi-Link Trunking (SMLT) draft-Lapuh-network-smlt-08", 2009.
Nadas, S. et al., "Virtual Router Redundancy Protocol (VRRP) Version 3 for IPv4 and IPv6", 2010.
Office Action for U.S. Appl. No. 12/725,249, Filing date Mar. 16, 2010, dated Sep. 12, 2012.
Office Action for U.S. Appl. No. 12/725,249, filed date Mar. 16, 2010, dated Apr. 26, 2013.
Office Action for U.S. Appl. No. 13/087,239, filed Apr. 14, 2011, dated Dec. 5, 2012.
Office Action for U.S. Appl. No. 13/087,239, filed Apr. 14, 2011, dated May 22, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,580, filed Apr. 22, 2011, dated Jun. 10, 2013.
Office Action for U.S. Appl. No. 13/042,259, filed Mar. 7, 2011, dated Mar. 18, 2013.
Office Action for U.S. Appl. No. 13/092,460, filed Apr. 22, 2011, dated Jun. 21, 2013.
Office Action for U.S. Appl. No. 13/042,259, filed Mar. 7, 2011, dated Jul. 31, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,752, filed Apr. 22, 2011, dated Feb. 5, 2013.
Office Action for U.S. Appl. No. 13/092,752, filed Apr. 22, 2011, dated Jul. 18, 2013.
Office Action for U.S. Appl. No. 13/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/092,877, filed Apr. 22, 2011, dated Mar. 4, 2013.
Office Action for U.S. Appl. No. 13/902,877, filed Apr. 22, 2011, dated Sep. 5, 2013.
Office Action for U.S. Appl. No. 12/950,968, filed Nov. 19, 2010, dated Jun. 7, 2012.
Office Action for U.S. Appl. No. 12/950,968, filed Nov. 19, 2010, dated Jan. 4, 2013.
Office Action for U.S. Appl. No. 13/092,864, filed Apr. 22, 2011, dated Sep. 19, 2012.
Office Action for U.S. Appl. No. 13/098,360, filed Apr. 29, 2011, dated May 31, 2013.
Office Action for U.S. Appl. No. 13/044,326, filed Mar. 9, 2011, dated Oct. 2, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.

(56) References Cited

OTHER PUBLICATIONS

Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Oct. 2, 2013, U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Huang, Nen-Fu et al., 'An Effective Spanning Tree Algorithm for a Bridged LAN', Mar. 16, 1992.
Office Action for U.S. Appl. No. 13/351,513, filed Jan. 17, 2012, dated Feb. 28, 2014.
Office Action for U.S. Appl. No. 13/533,843, filed Jun. 26, 2012, dated Oct. 21, 2013.
Office action dated Aug. 4, 2014, U.S. Appl. No. 13/050,102, filed Mar. 17, 2011.
Perlman, Radia et al., 'RBridges: Base Protocol Specification; Draft-ietf-trill-rbridge-protocol-16.txt', Mar. 3, 2010, pp. 1-117.
'An Introduction to Brocade VCS Fabric Technology', BROCADE white paper, http://community.brocade.com/docs/DOC-2954, Dec. 3, 2012.
U.S. Appl. No. 13/030,806 Office Action dated Dec. 3, 2012.
Office Action dated Mar. 26, 2014, U.S. Appl. No. 13/092,701, filed Apr. 22, 2011, Examiner Park, Jung H.
Office Action dated Apr. 9, 2014, U.S. Appl. No. 13/092,752, filed Apr. 22, 2011.
Brocade Brocade Unveils The Effortless Network, http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Office Action for U.S. Appl. No. 13/365,993, filed Feb. 3, 2012, from Cho, Hong Sol., dated Jul. 23, 2013.
Office Action for U.S. Appl. No. 12/950,974, filed Nov. 19, 2010, dated Dec. 20, 2012.
Office Action for U.S. Appl. No. 13/092,877, filed Apr. 22, 2011, dated Sep. 5, 2013.
Office Action for U.S. Appl. No. 13/092,887, dated Jan. 6, 2014.
Office Action for U.S. Appl. No. 13/098,490, filed May 2, 2011, dated Mar. 27, 2014.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/598,204, filed Aug. 29, 2012, dated Feb. 20, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009, pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011.
Office Action for U.S. Appl. No. 13/157,942, filed Jun. 10, 2011.

(56) References Cited

OTHER PUBLICATIONS

Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Office Action for U.S. Appl. No. 13/030,688, filed Feb. 18, 2011, dated Apr. 25, 2013.
Office Action for U.S. Appl. No. 13/044,301, filed Mar. 9, 2011, dated Jun. 11, 2013.
Office Action for U.S. Appl. No. 13/044,301, filed Mar. 9, 2011, dated Feb. 22, 2013.
Office Action for U.S. Appl. No. 13/050,102, filed Oct. 26, 2012, dated Oct. 26, 2012.
Office Action for U.S. Appl. No. 13/050,102, filed May 16, 2013, date May 16, 2013.
Office Action for U.S. Appl. No. 13/184,526, filed Jul. 16, 2011, dated Jan. 28, 2013.
Office Action for U.S. Appl. No. 13/184,526, filed May 22, 2013, dated May 22, 2013.
Office Action for U.S. Appl. No. 13/092,873, filed Apr. 22, 2011, dated Jun. 19, 2013.
Office Action for U.S. Appl. No. 13/365,993, filed Feb. 3, 2012, dated Jul. 23, 2013.
Office Action for U.S. Appl. No. 13/365,808, filed Jul. 18, 2013, dated Jul. 18, 2013.
Office Action for U.S. Appl. No. 13/312,903, filed Dec. 6, 2011, dated Jun. 13, 2013.
Office Action dated Jun. 18, 2015, U.S. Appl. No. 13/098,490, filed May 2, 2011.
Office Action dated Jun. 16, 2015, U.S. Appl. No. 13/048,817, filed Mar. 15, 2011.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 2, 2016, U.S. Appl. No. 14/488,173, filed Sep. 16, 2014.
Office Action dated Feb. 24, 2016, Application No. 13/971,397, filed Aug. 20, 2013.
Office Action dated Feb. 24, 2016, U.S. Appl. No. 12/705,508, filed Feb. 12, 2010.

* cited by examiner

MAC ADDRESS SYNCHRONIZATION IN A FABRIC SWITCH

RELATED APPLICATIONS

This application claims the benefit of U.S. Provisional Application No. 61/751,803, titled "MAC ADDRESS SYNCHRONIZATION IN A FABRIC SWITCH," by inventor Vardarajan Venkatesh, filed 11 Jan. 2013, which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011; U.S. patent application Ser. No. 12/725,249, titled "Redundant Host Connection in a Routed Network," by inventors Somesh Gupta, Anoop Ghanwani, Phanidhar Koganti, and Shunjia Yu, filed 16 Mar. 2010; and U.S. patent application Ser. No. 13/365,808, titled "CLEARING FORWARDING ENTRIES DYNAMICALLY AND ENSURING CONSISTENCY OF TABLES ACROSS ETHERNET FABRIC SWITCH," by inventors Mythilikanth Raman, Mary Manohar, Wei-Chivan Chen, Gangadhar Vegesana, Vardarajan Venkatesh, and Raju Shekarappa, filed 3 Feb. 2012, the disclosures of which are incorporated by reference herein.

BACKGROUND

1. Field

The present disclosure relates to network management. More specifically, the present disclosure relates to a method and system for distributed management of layer-2 address table entries.

2. Related Art

The growth of the Internet has brought with it an increasing demand for bandwidth. As a result, equipment vendors race to build larger and faster networks with large number of switches, each capable of supporting a large number of end devices, to move more traffic efficiently. However, managing the forwarding entries associated with these end devices becomes complex when the forwarding information is distributed across the switches. Particularly, due to distributed forwarding table updates, it is essential to maintain consistency across a network.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

While TRILL brings many desirable features to layer-2 networks, some issues remain unsolved when a distributed yet consistent mechanism to clear entries from a layer-2 address table is desired.

SUMMARY

One embodiment of the present invention provides a system for facilitating synchronization of MAC addresses in a fabric switch. During operation, the system divides a number of media access control (MAC) addresses associated with devices coupled to an interface of the switch into a number of chunks. The system then computes a checksum for a respective chunk of MAC addresses. In addition, the system broadcasts MAC address information of the chunk to facilitate MAC address synchronization in a fabric switch of which the switch is a member, and to manage the chunks and their corresponding checksum, thereby correcting an unsynchronized or race condition in the fabric switch.

In a variation on this embodiment, managing the chunks and their corresponding checksum involves refraining from sending an updated checksum of a respective chunk after at least one MAC address within that chunk has been updated, if an update to the corresponding chunk has been received from another switch.

In a variation on this embodiment, the system sends a checksum of a respective chunk to other switches in the fabric switch after a guard timer has expired.

In a variation on this embodiment, the system sends content of a chunk to a remote switch in response to a message indicating an unsynchronized condition associated with a chunk from the remote switch, if an updated to the chunk has not been received by the local switch within a past predetermined time window.

In a variation on this embodiment, the system refrains from comparing a new checksum received for a chunk from an owner switch of the chunk, if an update to the chunk has been received from another switch other than the owner switch within a past predetermined time window.

In a variation on this embodiment, the checksum for a respective chunk is related to the content of that chunk but not related to the order of the MAC addresses in that chunk.

In a further variation on this embodiment, each chunk of MAC addresses associated with the interface includes MAC addresses with the same last n bits, wherein n is a predetermined number.

In a further variation on this embodiment, any chunking method that is dependent on the content only can be used

DETAILED DESCRIPTION

Figure 1:
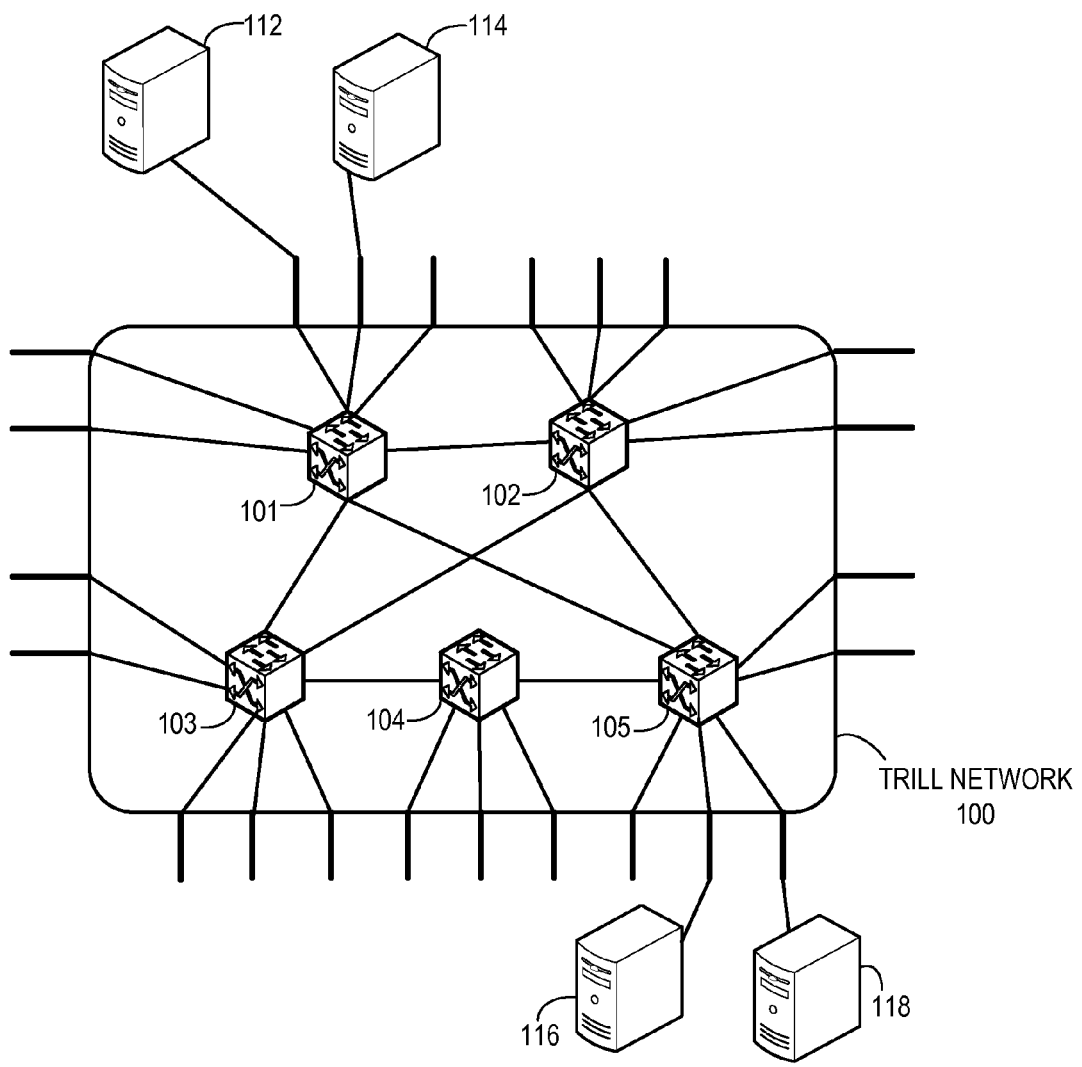
FIG. 1 illustrates an exemplary TRILL network with distributed forwarding information, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

In embodiments of the present invention, the problem of consistently layer-2 (L2) media access control (MAC) address tables in a fabric switch is solved by dividing the MAC addresses maintained at a respective member switch into a number of chunks, generating a signature (such as a checksum) for each chunk, and comparing these signatures in the process of updating the MAC address tables.

In general, consider a fabric switch, which includes a number of physical member switches and functions as a single, logical switch (for example, as one logical L2 switch), such as Brocade's virtual cluster switch (VCS). Each member switch (which in the case of VCS can be a transparent interconnection of lots of links (TRILL) routing bridge (RBridge) maintains a MAC address database for L2 forwarding. Ideally, this MAC address database is the same at every member switch for the fabric switch to function properly. In order for the MAC address database to be consistent across all member switches in the fabric, typically, a software based MAC distribution method is used to distribute MAC addresses learned at a particular member switch to all other member switches in the fabric. However, under different circumstances the MAC address database at various nodes could go out of synchronization (such as when an edge device is moved from one member switch to another), which can result in erroneous forwarding. The method and system disclosed herein facilitate detection and correction of such potential erroneous forwarding.

Traditionally for bridged networks there is no notion of identical bridge tables at all bridges in the network. This is because bridges learn MAC addresses when traffic passes through them. In a bridged network where MAC databases are updated from node-to-node through software (as opposed to the natural learning behavior) is with multi-chassis trunking (MCT), also called virtual link aggregation (VLAG), where two or more RBridges form a virtual RBridge to facilitate link aggregation. In such scenarios the MAC synchronization problem is considerably simpler because typical vendors do not support MCT of more than two physical switches, and there is no need to synchronize outside the MCT for the MACs learned on the MCT. Consequently, the types of race conditions are much more limited. L2 switch stacking solutions also work on the notion of a stack master which is responsible for disseminating the MAC information across the stack member switches hence the synchronization problems can be avoided. However, in a fabric switch, because MAC addresses learned at different member switches need to be distributed throughout the fabric, and because edge devices are free to move from one member switch to another, race conditions often occur.

Note that in this disclosure, a member switch of a fabric switch is referred to as an RBridge, although embodiments of the present invention are not limited to TRILL implementations.

The MAC database as a whole has many owners for its various parts, because the MAC addresses can be learned at different member switches. Specifically, definition of an RBridge owning a MAC is that the MAC is behind an edge L2 interface of that RBridge. All physical L2 interface MACs are owned by the corresponding associated RBridge. For a MAC address behind a vLAG one could argue that all the member RBridges of that vLAG own the MAC. In this disclosure, the RBridge that actually sends out software update message for the MAC address are considered its owners. It is possible that multiple members of the vLAG could send out a MAC address database update (this can happen if the MAC address is seen for the first time simultaneously by multiple members of the vLAG). Therefore, the concept of ownership of a MAC behind a vLAG is manifested by a set bit of the bitmap representing the member RBridges of the vLAG. The degenerate case of this example is when the bitmap is empty—this can happen when all the original nodes of the vLAG have left the vLAG. The current vLAG primary is considered the owner of such MAC addresses.

Regardless of which switch is the owner of a given MAC, the owner synchronizes the MAC with all other members of the fabric. Hence in a steady state it is expected that all the nodes have a common view of the entire MAC database. Due to different race conditions it is possible that this view is disrupted.

FIG. 1 illustrates an exemplary TRILL network with distributed MAC forwarding information, in accordance with an embodiment of the present invention. As illustrated in FIG. 1, a TRILL network 100 includes RBridges 101, 102, 103, 104, and 105. End devices 112 and 114 are coupled to RBridge 101 and end devices 116 and 118 are coupled to RBridge 105. RBridges in network 100 use edge ports to communicate to end devices and TRILL ports to communicate to other RBridges. For example, RBridge 101 is coupled to end devices 112 and 114 via edge ports and to RBridges 102, 103, and 105 via TRILL ports.

In some embodiments, TRILL network 100 may be an Ethernet fabric switch. In some further embodiments, the Ethernet fabric switch may be a virtual cluster switch. In an exemplary Ethernet fabric switch, any number of RBridges in any arbitrary topology may logically operate as a single switch. Any new RBridge may join or leave the Ethernet fabric switch in "plug-and-play" mode without any manual configuration.

During operation, in FIG. 1, RBridge 101 dynamically learns the MAC addresses of end devices 112 and 114 when the devices send frames through RBridge 101 and stores them in a local forwarding table. In some embodiments, RBridge 101 distributes the learned MAC addresses to all other RBridges in network 100. Similarly, RBridge 105 learns the MAC addresses of end devices 116 and 118, and distributes the information to all other RBridges.

Figure 2A:
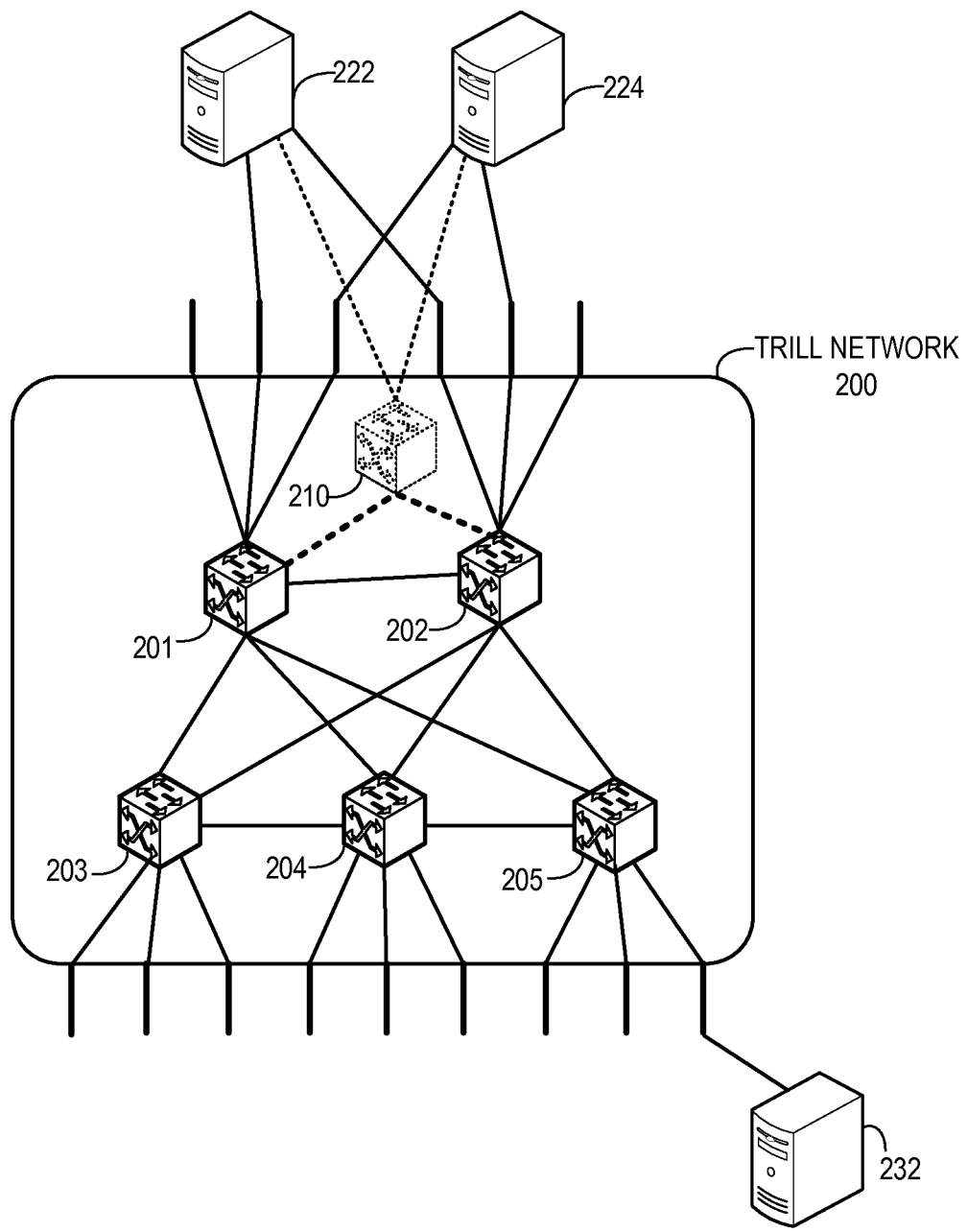
FIG. 2A illustrates an exemplary network where a virtual RBridge identifier is assigned to two physical TRILL RBridges which are coupled to end devices via virtually aggregated links, in accordance with an embodiment of the present invention.

In a virtual link aggregation, multiple RBridges can learn the MAC address of an end device and may become the owner of all forwarding entries associated with the MAC address. The ownership association and the two-tier clear command can maintain consistency in forwarding tables for such multiple ownership entries as well. FIG. 2A illustrates an exemplary network where a virtual RBridge identifier is assigned to two physical TRILL RBridges which are coupled to end devices via virtually aggregated links, in accordance with an embodiment of the present invention. As illustrated in FIG. 2A, a TRILL network 200 includes RBridges 201, 202, 203, 204, and 205. RBridge 205 is coupled to an end device 232. End devices 222 and 224 are both dual-homed and coupled to RBridges 201 and 202. The goal is to allow a dual-homed end station to use both physical links to two separate TRILL RBridges as a single, logical aggregate link, with the same MAC address. Such a configuration would achieve true redundancy and facilitate fast protection switching.

RBridges 201 and 202 are configured to operate in a special "trunked" mode for end devices 222 and 224. End devices 222 and 224 view RBridges 201 and 202 as a common virtual RBridge 210, with a corresponding virtual RBridge identifier. Dual-homed end devices 222 and 224 are considered to be logically coupled to virtual RBridge 210 via logical links represented by dotted lines. Virtual RBridge 210 is considered to be logically coupled to both RBridges 201 and 202, optionally with zero-cost links (also represented by dotted lines). RBridges which participate in link aggregation and form a virtual RBridge are referred to as "partner RBridges."

When end device 222 sends a packet to end device 232 via ingress RBridge 201, RBridge 201 learns the MAC address of end device 222 and distributes the learned MAC address to all other RBridges in network 200. All other RBridges update their respective forwarding tables with an entry corresponding to end device 222 and assign RBridge 201 as the owner of the entry. As end device 222 is coupled to RBridge 202, end device 222 may send a packet to end device 232 via RBridge 202 as well. Consequently, RBridge 202 learns the MAC address of end device 222 and distributes the learned MAC address to all other RBridges in network 200. All other RBridges then add RBridge 202 as an owner of the entry associated with end device 222 as well.

Figure 2B:
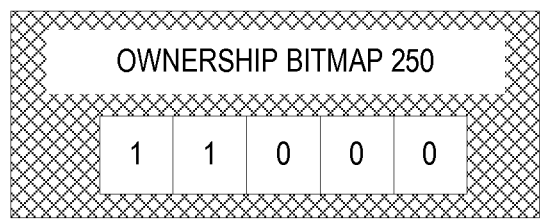
FIG. 2B illustrates an exemplary ownership bitmap for a layer-2 forwarding table entry, wherein the forwarding table entry corresponds to an end device associated with a virtual RBridge, in accordance with an embodiment of the present invention.

FIG. 2B illustrates an exemplary ownership bitmap for a layer-2 forwarding table entry, wherein the forwarding table entry corresponds to an end device associated with a virtual RBridge, in accordance with an embodiment of the present invention. The two most significant bits of ownership bitmap 250 in FIG. 2B are associated with RBridges 201 and 202, respectively. In this example, only the two most significant bits of bitmap 250 are set. Hence, bitmap 250 represents an ownership by RBridges 201 and 202, and can be used to indicate the ownership of the MAC addresses of end devices 222 and 224 in respective forwarding tables in all RBridges in network 200.

In FIG. 2A, during operation, a first command to clear dynamically learned MAC addresses from forwarding tables is issued from RBridge 203. Upon receiving the first clear command, RBridge 201 issues a second clear command to terminate ownership of entries owned by RBridge 201. When other RBridges receive this second command, they remove the ownership associations between RBridge 201 and the MAC addresses of end devices 222 and 224. In some embodiments, the ownership association is removed by clearing the bit corresponding to RBridge 201 in an ownership bitmap. However, as forwarding entries associated with end devices 222 and 224 are also owned by RBridge 202, other RBridges do not remove these entries from local forwarding tables. Upon receiving the first clear command, RBridge 202 also issues the second clear command to terminate ownership of entries owned by RBridge 202. When other RBridges receive this second command from RBridge 202, the ownership associations between RBridge 201 and the MAC addresses of end devices 222 and 224 are terminated. As no other RBridge owns the entries for the MAC addresses of end devices 222 and 224, they are removed from the respective forwarding tables in all RBridges in network 200.

To address MAC synchronization problems, embodiments of the present invention divides all the MAC addresses learned at a respective interface on an RBridge into a number of content dependent chunks, and generate a checksum for each chunk so that these checksums can be compared to determine whether a potential race condition has occurred. Also, the chunking scheme allows the detection and repair schemes to scale at various extremes (such as a large number of MACs on a single port and/or single VLAN). In general, the chunking scheme produces a reasonable chunk size that is neither too large nor too small. In addition, the chunks are content dependent, but are independent from the orders of the MAC addresses within.

In one embodiment, the following chunking scheme is used on each Rbridge in the fabric: First, an RBridge, referred to as R1, chooses a local L2 interface, referred to as I1. Note that vLAGs of which R1 is part of are also considered to be a local L2 interface for R1. Next, consider the set of MACs, referred to as (S), learned on I1 which are owned by R1. In the case of a vLAG, the vLAG primary switch can further partition this set of MACs into two sets, one for the MACs that the primary switch really owns (e.g., physically coupled MACs), and one for the MACs whose corresponding bit associated with the primary switch is not set and R1 just happens to "own" the MAC because it is the current vLAG primary switch.

The mechanism to divide (S) into chunks is content dependant. Consider each of the sets above. Take, for example, the least significant n bits (say n=4) of each MAC and based on these n bits divide (S) into $2^n$ (which in this case is 16) disjoint sets (chunks). On average, this scheme would result in a chunk size that is 1/16 the size of (S). Note that each member switch of the fabric can independently identify a respective chunk by the 3-tuple<RBridge-id, interface id, value-of-last-4-bits-of-MAC>. This chunk identifier can be sent along with the chunk checksum as described below.

In order to compare the consistency of MAC address maintained at different switches, embodiments of the present invention allows a respective switch to exchange chunk signatures (e.g., checksums). Comparing chunk signatures facilitates detection of MAC address record discrepancy. In general, the checksum of a chunk should exhibit the following properties:

(1) The chances of two different MAC address sets producing the same checksum should be very low.
(2) The checksum should be an unordered set, as opposed to an ordered set. In other words, the computation of a checksum should be commutative.
(3) Ideally, the checksum size is significantly smaller than the size of the chunk.
(4) The computation load of calculating the checksum should be reasonably low.
(5) It is preferable that incremental checksums can be calculated as MAC addresses are added or removed from the chunk. For example, if C is the checksum of S, and a MAC address {M} is added to S, the system preferably computes the new checksum of {S}∪{M} incrementally from C Likewise, for deletion of a MAC address from S, the system also calculates the new checksum incrementally, without having to re-compute the checksum for the entire set. This property makes the checksum computation a "pay-as-you-go" scheme and saves on computational resources.

Various checksum computation algorithms can be used. In one embodiment, the system uses a modulo prime multiplication and inverse method. With this method the system can attain the commutative property for the checksum and perform incremental computation. A prime that can be used here is $2^{31}-1$ (a Mersenne prime). The system can perform the computation on each of the corresponding bytes of the MACs. Specifically, let M1=M10:M11:M12:M13:M14:M15 and M2=M20:M21:M22:M23:M24:M25. The system then computes C1=f(M10, M20), C2=f(M11, M21) . . . C6=f(M15, M25). In addition, the system breaks up the VLANID in a byte-wise manner and computes two additional checksums. The system then stores each of the byte-wise checksum result in 32-bit precision. When a MAC address is added to the set, the system updates the byte-wise checksum using the added MAC address. When a MAC address is deleted from the set, the system updates the checksum using the byte-wise multiplicative inverse of the deleted MAC (which can be more than one byte). In one embodiment, the system can pre-compute and store the multiplicative inverses of 0-255 modulo the prime. The size of this checksum is 4*8=32 bytes. This scheme requires 8*4=32 modulo multiplications per MAC entry that is added to or deleted from a chunk. To get additional uncorrelated hashes, the system can add a seed to each of the bytes, e.g., C1'=f(M10+3, M20+3), etc. If the system uses 4 such seeds, it can obtain 32*4=128 bytes of total checksum.

Another commutative operation with inverse could be addition (again byte-by-byte of the MAC). During an addition of a MAC to the chunk the system does a byte-wise addition to update the checksum and during deletion of the MAC from the set it does a byte-wise subtraction to update the checksum. In order to strengthen the checksum to reduce likelihood of collision, the system could also do sum of squares, cubes, fourths, etc. of the bytes of the MAC (since byte-wise add checksum match for 2 sets of MACs does not automatically mean the byte-wise sum of squares would match and so on). All these higher powers can be pre-computed and stored (255 values). This provides a good compromise over the multiply scheme. For the addition the system can calculate all the results up to 32 bit precision—that way the sum and sum of squares would not hit the 2^32 limit based on the average size of each set through chunking. This checksum essentially would have the same size as modulo-prime multiplication except that it is computationally cheaper.

Figure 2C:
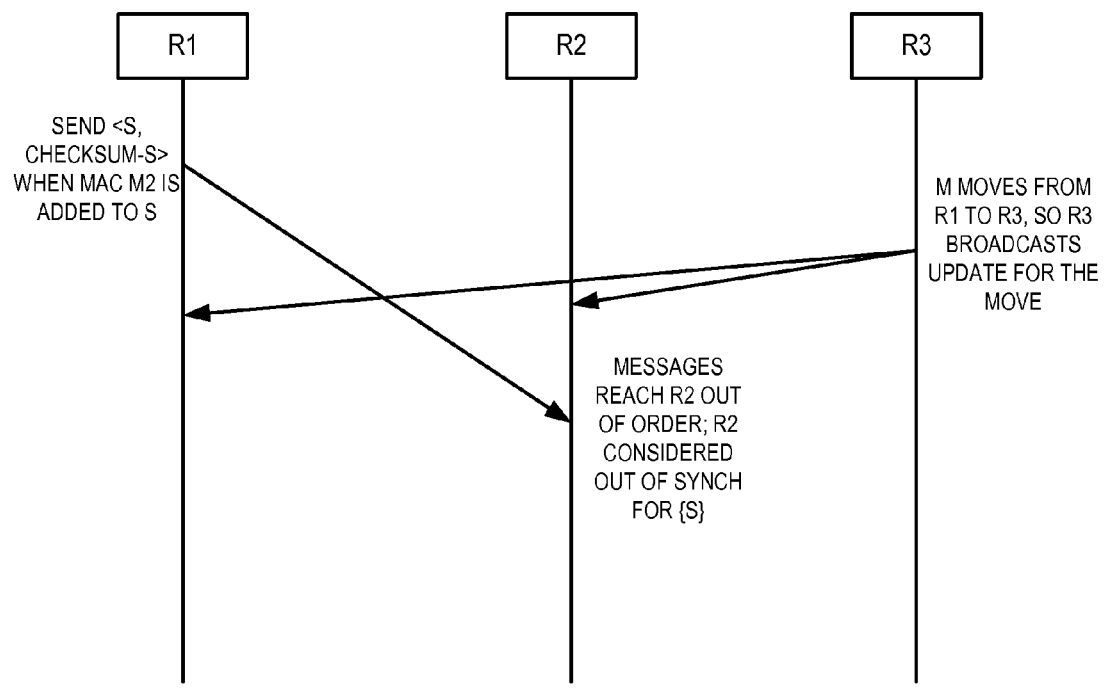
FIG. 2C illustrates an exemplary scenario where MAC address update messages can reach a node out of order.

FIG. 2C illustrates an exemplary scenario where MAC address update messages can reach a node out of order. In this example, let S be a chunk of MACs owned by RBridge R1 that it is trying to make sure the content of S is consistent across the fabric switch. The goal is to allow nodes in the fabric switch to compare the checksum of a respective chunk to determine discrepancies. This approach is valid as long as there has not been any change to S caused by nodes other than R1. As long as all changes to S are from R1 then comparing checksums is meaningful. Otherwise a checksum mismatch can result from a timing (race) situation. In the example in FIG. 2, assume that MAC M originally belongs to {S} at R1. Assume that first a new MAC M2 is added to {S}. As a result, R1 sends out a MAC address update, together with the checksum for {S} and the identifier of {S}. Shortly thereafter, the device associated with MAC M moves from R1 to R3. In response, R3 broadcasts a MAC address update to both R1 and R2. Assume that R3's update reaches R2 before R1's update does. Consequently, R2 considers these two conflicting update messages for {S}.

One embodiment of the present invention adopts the following procedure to correct the above race condition:

The owner (R1) of a set of MACs {S} would send out a new checksum of {S} together with its MAC address update if there has been no change to S by another RBridge (R3 in this example) in the last t (e.g., t=3) seconds.

The receiver of a checksum does not perform a checksum comparison of {S} if there has been a change to S by another RBridge in the last t seconds.

If an out-of-synch message reaches R1 within t seconds of a change to {S} by another RBridge, R1 would discard this out-of-synch message.

In the case of a vLAG, if any of the set of MAC addresses with their associated bit in the ownership bitmap empty has changed in the last t seconds, the primary switch of the vLAG will not send a checksum for that set. Likewise, the receiver of the checksum will not compare the received checksum if its associated ownership bitmap has changed in the last t seconds.

Figure 3:
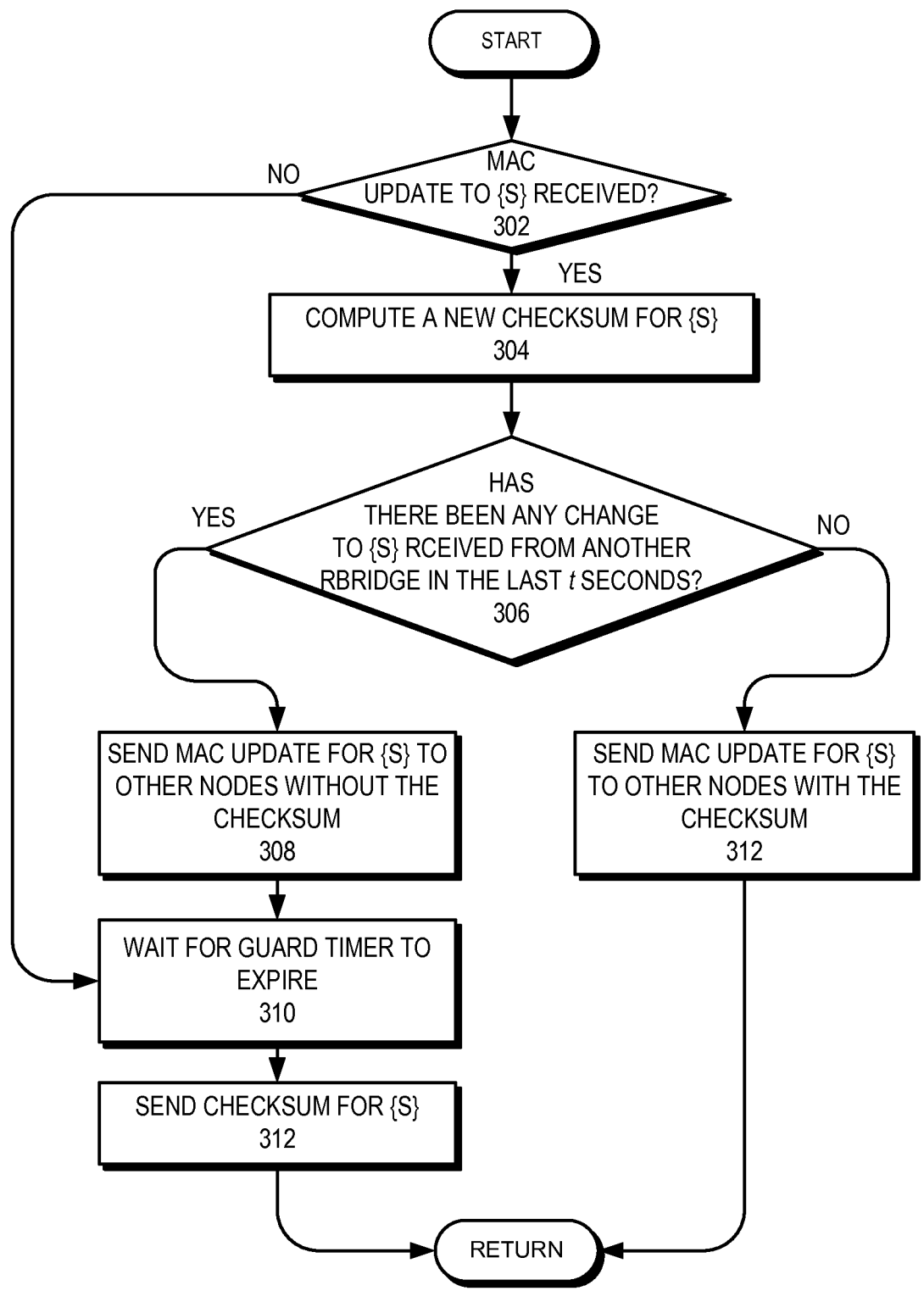
FIG. 3 presents a flow chart illustrating the process of an owner RBridge sending out a MAC update, in accordance with one embodiment of the present invention.

FIG. 3 presents a flow chart illustrating the process of an owner RBridge sending out a MAC update, in accordance with one embodiment of the present invention. During operation, the owner of a chunk of MAC addresses {S} checks whether any MAC address in {S} has been updated (operation 302). If so, the owner computes a new checksum for {S} (operation 304). Subsequently, the system determines whether there has been any change to {S} received from another RBridge (operation 306). If there has been no such change in the last t seconds, the owner sends out a MAC address update for {S} to other nodes with the checksum of {S} (operation 312).

If there has been at least one change to one or more MACs in {S} in the last t seconds, the system sends out the MAC update for {S} to other nodes without the checksum (operation 308). Subsequently, the system waits for a guard timer to expire (operation 310). In one embodiment, this guard timer can be randomized and is statically set to be approximately 30 seconds. After the guard timer is expired, the system then broadcasts the checksum for {S} (operation 312).

When there is no update received at the owner node (i.e., the "NO" branch at operation 302), the system by default waits for the guard timer to expire (operation 310). Each time the guard timer expires, the system broadcasts the checksum for {S} (operation 312).

Figure 4:
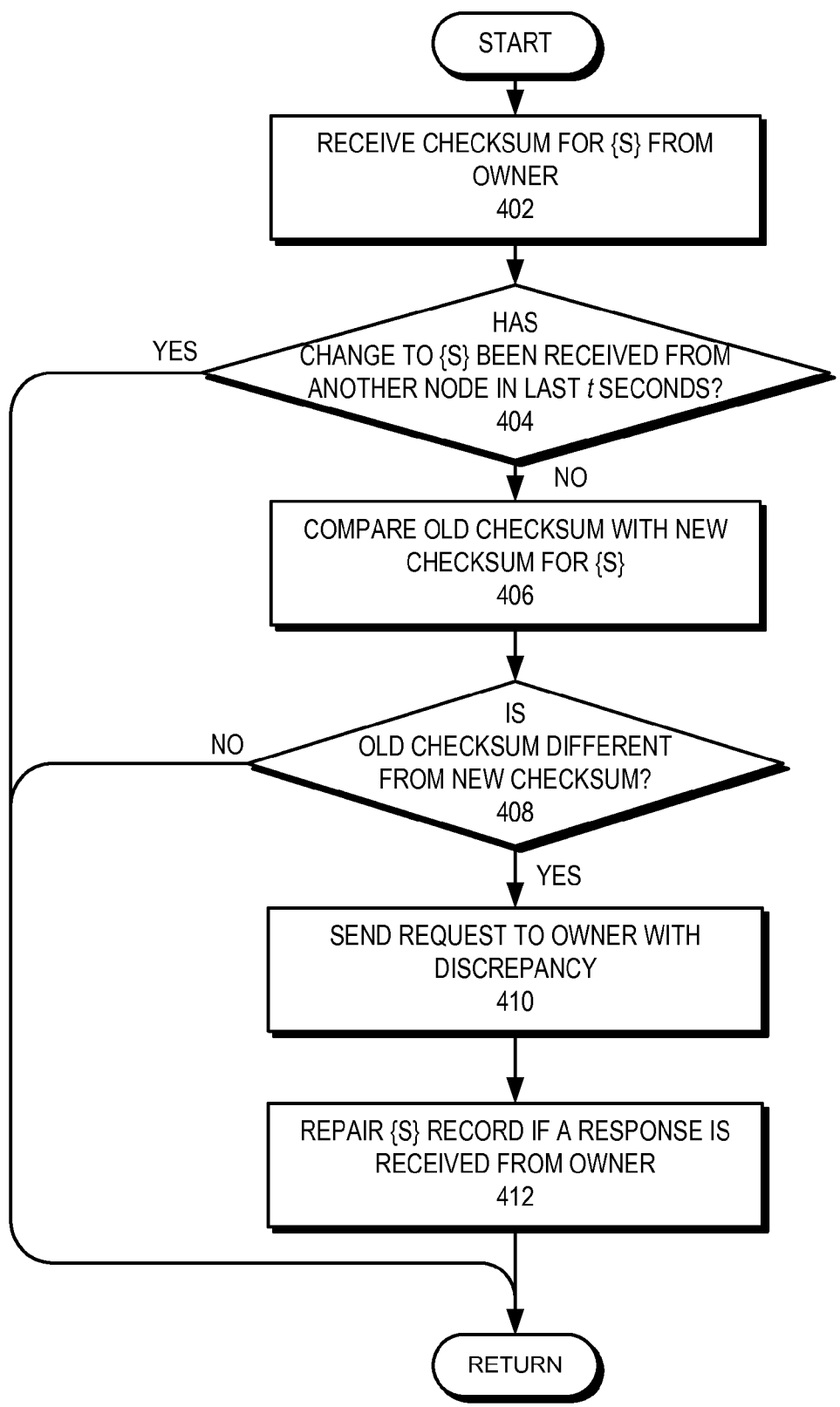
FIG. 4 presents a flow chart illustrating the process of a receiver RBridge receiving a chunk checksum update, in accordance with one embodiment of the present invention.

FIG. 4 presents a flow chart illustrating the process of a receiver RBridge receiving a chunk checksum update, in accordance with one embodiment of the present invention. During operation, a receiver RBridge receives the checksum for a chunk {S} from the owner of {S} (operation 402). The receiving node then determines whether it has received change to {S} from another node in the last t seconds (operation 404). If so, the receiving node does nothing. Otherwise, the receiving node compares its old checksum with the new received checksum (operation 406). The receiving node then determines if the old checksum is different from the new checksum (operation 408). If the two are the same, the system does nothing. If they are different, the receiving node sends a request to the owner, together with the discrepancy (operation 410). Subsequently, if the owner sends a response (e.g., the entire content of {S}) to the receiving node, the receiving node repairs its records for {S} (operation 412).

To repair the inconsistent records of {S} at a remote node, once the owner of a set of MACs receives an out-of-sync message from the remote node, it could trigger a few directed queries to reconfirm that it is not a transient/race condition—the rules of when to send the checksum would still follow the false positive reduction heuristics as mentioned above. Alternatively, it could track the number of consecutive out-of-syncs of a chunk from a remote node. If this number exceeds a threshold number the owner would then unicast the contents of that chunk to that remote node.

The receiver of a chunk of MACs {S} would have to apply the difference from its version of S, referred to as S'. In order that there is no unnecessary data path effects, this can be done by: adding entries {S-S'}; deleting {S'-S}; and for entries {S∩S'} performing no operation.

Exemplary Switch System

Figure 5:
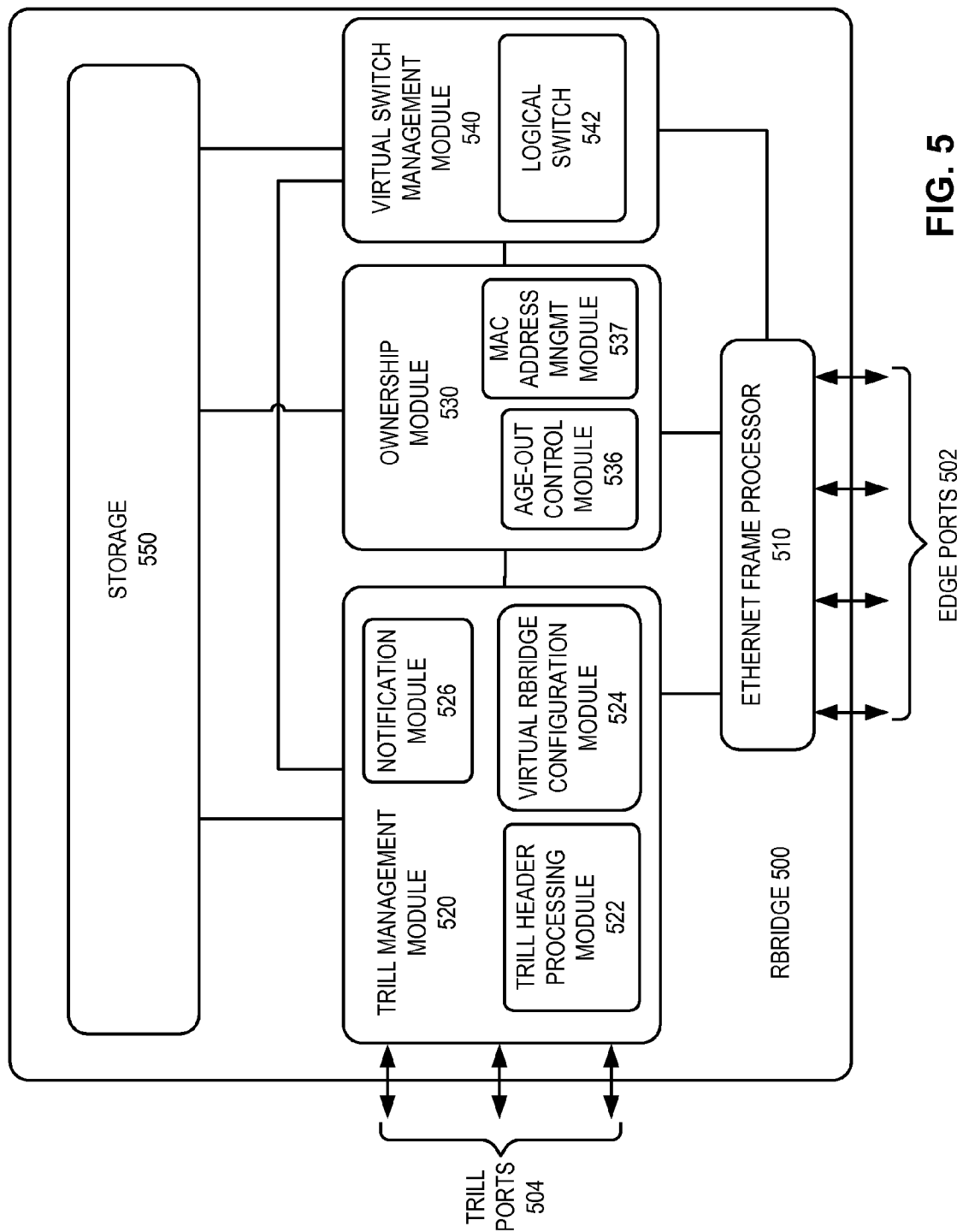
FIG. 5 illustrates an exemplary architecture of a switch with distributed forwarding table update capability, in accordance with an embodiment of the present invention.

FIG. 5 illustrates an exemplary architecture of a switch with distributed forwarding table update capability, in accordance with an embodiment of the present invention. In this example, an RBridge 500 includes a number of edge ports 502 and TRILL ports 504, a TRILL management module 520, an ownership module 530, an Ethernet frame processor 510, and a storage 550. TRILL management module 520 further includes a TRILL header processing module 522 and a notification module 526.

TRILL ports 504 include inter-switch communication channels for communication with one or more RBridges. These inter-switch communication channels can be implemented via a regular communication port and based on any open or proprietary format. Furthermore, the inter-switch communication between RBridges is not required to be direct port-to-port communication.

During operation, edge ports 502 receive frames from (and transmit frames to) end devices. Ethernet frame processor 510 extracts and processes header information from the received frames. From the extracted header, RBridge 500 learns the MAC addresses of end devices. Ownership module 530 creates an ownership association between the RBridge and the learned MAC addresses. Notification module 526 creates notification messages about the ownership association. TRILL header processing module 522 encapsulates the notification messages in TRILL packets and forwards the notification to all other RBridges.

In some embodiments, RBridge 500 may participate in a virtual link aggregation and form a virtual RBridge, wherein TRILL management module 520 further includes a virtual RBridge configuration module 524, and ownership module 530 further includes an age-out control module 536 and a MAC address management module 537. TRILL header processing module 522 generates the TRILL header and outer Ethernet header for ingress frames corresponding to the virtual RBridge. Virtual RBridge configuration module 524 manages the communication with RBridges associated with the virtual RBridge and handles various inter-switch communications, such as link and node failure notifications. Virtual RBridge configuration module 524 allows a user to configure and assign the identifier for the virtual RBridges. Furthermore, age-out control module 536 handles aging out of forwarding entries associated with dynamically learned MAC addresses from the virtual link aggregation.

MAC address management module 537 can include a chunking module, a checksum module, and a MAC synchronization module. The chunking module is responsible for dividing MAC addresses into chunks. The checksum module is responsible for computing checksums for the chunks. The MAC synchronization module is responsible for performing the MAC synchronization methods described above.

In some embodiments, RBridge 500 is in an Ethernet fabric switch, and may include a virtual switch management module 540 and a logical switch 542. Virtual switch management module 540 maintains a configuration database in storage 550 that maintains the configuration state of every switch within the fabric switch. Virtual switch management module 540 also maintains the state of logical switch 542, which is used to join other fabric switches. In some embodiments, logical switch 542 can be configured to operate in conjunction with Ethernet frame processor 510 as a logical Ethernet switch.

Note that the above-mentioned modules can be implemented in hardware as well as in software. In one embodiment, these modules can be embodied in computer-executable instructions stored in a memory which is coupled to one or more processors in RBridge 500. When executed, these instructions cause the processor(s) to perform the aforementioned functions.

In summary, embodiments of the present invention provide a switch, a method and a system for distributed management of layer-2 address table entries. In one embodiment, the switch includes an ownership management mechanism and a notification mechanism. The ownership management mechanism maintains a local ownership association between the switch and a medium access control (MAC) address learned at the switch, and terminates the local ownership association for the MAC address. The notification mechanism generates a first notification specifying the local ownership association and a second notification specifying the termination of the local ownership association.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   chunking circuitry configured to divide a number of media access control (MAC) addresses associated with devices coupled to an interface of the switch into a number of chunks, wherein a chunk includes a plurality of MAC addresses;
   checksum circuitry configured to compute a checksum for a respective chunk of MAC addresses; and
   MAC synchronization circuitry configured to:
      construct a broadcast message comprising MAC address information of one or more chunks to facilitate MAC address synchronization in a network of interconnected switches, wherein the switch is a member of the network of interconnected switches;
      manage the chunks and their corresponding checksums, thereby correcting an unsynchronized or race condition in the network of interconnected switches.

2. The switch of claim 1, wherein while managing the chunks and their corresponding checksums, the MAC synchronization circuitry is configured to refrain from constructing a notification message comprising an updated checksum of a chunk, which includes at least one MAC address that has been updated, in response to detecting an update to the corresponding chunk received from another switch.

3. The switch of claim 1, wherein the MAC synchronization circuitry is further configured to construct a notification message comprising a checksum of a respective chunk in response to detecting that a guard timer has been expired, wherein the notification message is destined to other switches in the network of interconnected switches.

4. The switch of claim 1, wherein the MAC synchronization circuitry is further configured to construct a notification message comprising content of a chunk in response to detecting an unsynchronized condition associated with the chunk received from a remote switch, wherein the notification message is destined to the remote switch, and wherein an update to the chunk has not been detected by the switch within a past predetermined time window.

5. The switch of claim 1, wherein the MAC synchronization circuitry is further configured to refrain from comparing a new checksum for a chunk received from an owner switch of the chunk, in response to detecting an update to the chunk received from another switch other than the owner switch within a past predetermined time window.

6. The switch of claim 1, wherein the checksum for a respective chunk is related to the content of that chunk but not related to the order of the MAC addresses in that chunk.

7. The switch of claim 1, wherein each chunk of MAC addresses associated with the interface includes MAC addresses with a same last n bits, wherein n is a predetermined number.

8. A method, comprising:
dividing a number of media access control (MAC) addresses associated with devices coupled to an interface of the switch, wherein a chunk includes a plurality of MAC addresses;
computing a checksum for a respective chunk of MAC addresses;
constructing a broadcast message comprising MAC address information of one or more chunks to facilitate MAC address synchronization in a network of interconnected switches, wherein the switch is a member of the network of interconnected switches; and
managing the chunks and their corresponding checksums, thereby correcting an unsynchronized or race condition in the network of interconnected switches.

9. The method of claim 8, wherein managing the chunks and their corresponding checksums comprises refraining from constructing a notification message comprising an updated checksum of a chunk, which includes at least one MAC address that has been updated, in response to detecting an update to the corresponding chunk received from another switch.

10. The method of claim 8, further comprising constructing a notification message comprising a checksum of a respective chunk in response to detecting that a guard timer has been expired, wherein the notification message is destined to other switches in the network of interconnected switches.

11. The method of claim 8, further comprising constructing a notification message comprising content of a chunk in response to detecting an unsynchronized condition associated with the chunk received from a remote switch, wherein the notification message is destined to the remote switch, and wherein an update to the chunk has not been detected by the switch within a past predetermined time window.

12. The method of claim 8, further comprising refraining from comparing a new checksum for a chunk received from an owner switch of the chunk, in response to detecting an update to the chunk received from another switch other than the owner switch within a past predetermined time window.

13. The method of claim 8, wherein the checksum for a respective chunk is related to the content of that chunk but not related to the order of the MAC addresses in that chunk.

14. The switch of claim 8, wherein each chunk of MAC addresses associated with the interface includes MAC addresses with a same last n bits, wherein n is a predetermined number.

15. A computing system for a switch, comprising:
a processor; and
a storage device storing instructions which when executed by the processor cause the processor to perform a method, the method comprising:
dividing a number of media access control (MAC) addresses associated with devices coupled to an interface of the switch, wherein a chunk includes a plurality of MAC addresses;
computing a checksum for a respective chunk of MAC addresses;
constructing a broadcast message comprising MAC address information of one or more chunks to facilitate MAC address synchronization in a network of interconnected switches, wherein the switch is a member of the network of interconnected switches; and
managing the chunks and their corresponding checksums, thereby correcting an unsynchronized or race condition in the network of interconnected switches.

16. The computing system of claim 15, wherein managing the chunks and their corresponding checksums comprises refraining from constructing a notification message comprising an updated checksum of a chunk, which includes at least one MAC address that has been updated, in response to detecting an update to the corresponding chunk received from another switch.

17. The computing system of claim 15, wherein the method further comprises constructing a notification message comprising a checksum of a respective chunk in response to detecting that a guard timer has expired, wherein the notification message is destined to other switches in the network of interconnected switches.

18. The computing system of claim 15, wherein the method further comprises constructing a notification message comprising content of a chunk to a remote switch in response to detecting an unsynchronized condition associated with the chunk received from a remote switch, wherein the notification message is destined to the remote switch, and wherein an update to the chunk has not been detected by the switch within a past predetermined time window.

19. The computing system of claim 15, wherein the method further comprises refraining from comparing a new checksum received for a chunk from an owner switch of the chunk in response to detecting an update to the chunk received from another switch other than the owner switch within a past predetermined time window.

20. The computing system of claim 15, wherein the checksum for a respective chunk is related to the content of that chunk but not related to the order of the MAC addresses in that chunk.

21. The computing system of claim 15, wherein each chunk of MAC addresses associated with the interface includes MAC addresses with a same last n bits, wherein n is a predetermined number.

* * * * *